United States Patent [19]

Velan

[11] Patent Number: 4,579,316
[45] Date of Patent: Apr. 1, 1986

[54] METAL SEATED BALL VALVES

[75] Inventor: Adolf K. Velan, Westmount, Canada

[73] Assignee: Velan Inc., Montreal, Canada

[21] Appl. No.: 675,020

[22] Filed: Nov. 26, 1984

[51] Int. Cl.[4] .............................................. F16K 5/14
[52] U.S. Cl. .................................... 251/162; 251/77; 251/160; 251/314; 251/360
[58] Field of Search ................... 251/56, 77, 160, 162, 251/163, 180–184, 214, 215, 225, 284, 286, 309, 311, 312, 314, 315, 316, 359, 360, 368; 137/454.6

[56] References Cited

U.S. PATENT DOCUMENTS

| | | | |
|---|---|---|---|
| 1,857,861 | 5/1932 | Nordstrom | 251/162 |
| 1,881,953 | 10/1932 | Redding | 251/162 |
| 2,052,462 | 8/1936 | Grissett | 251/162 |
| 2,125,810 | 8/1938 | Reed | 251/162 |
| 2,559,695 | 7/1951 | Allen et al. | 251/314 |
| 2,565,244 | 8/1951 | Laurent | 251/160 |
| 2,567,032 | 9/1951 | Schmidt | 251/160 |
| 2,705,609 | 4/1955 | Prescott | 251/162 |
| 3,656,711 | 4/1972 | Toelke | 251/368 |
| 3,685,793 | 8/1972 | Szumilas et al. | 251/312 |

Primary Examiner—Samuel Scott
Assistant Examiner—Noah Kamen
Attorney, Agent, or Firm—Swabey, Mitchell, Houle, Marcoux & Sher

[57] ABSTRACT

An arrangement for top entry ball valve, providing relief from seating load when turning the ball to effect either opening or closing of the valve by a handle connected to the ball via a stem. The arrangement including: a nut having an external thread thereon, the nut being secured to the stem by a key to ensure positive rotation of the nut with the stem during the valve opening or closing; a spring operatively engaging the stem to inhibit free rotational movement thereof relative to the valve body; a handle threaded engaging the external thread of the nut; and an abutment on the nut and projecting therefrom and adapted to engage a further abutment on the handle, the further abutment comprising a slot in the handle, the slot being of greater circumferential dimension to that of the nut abutment whereby the nut abutment and further abutment are positionable one to another in spaced relation affording limited and relative rotational movement between the nut and the handle via the engaging threads whereby to impart receptacle movement of the stem relative to the handle and whereupon engagement of the nut abutment would be further handle abutment, the handle imparts rotational movement to the stem and accordingly the ball relative to the valve body.

22 Claims, 6 Drawing Figures

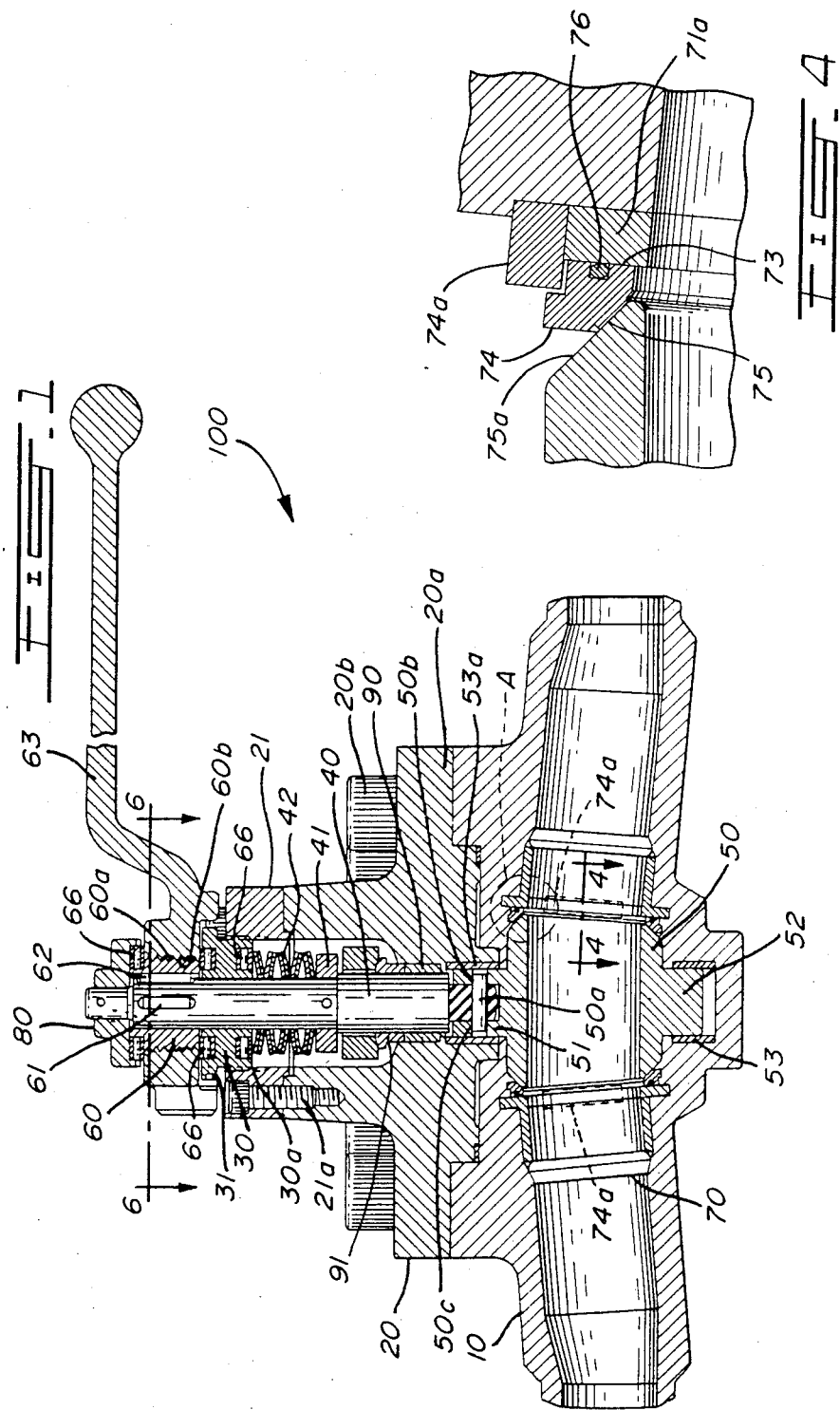

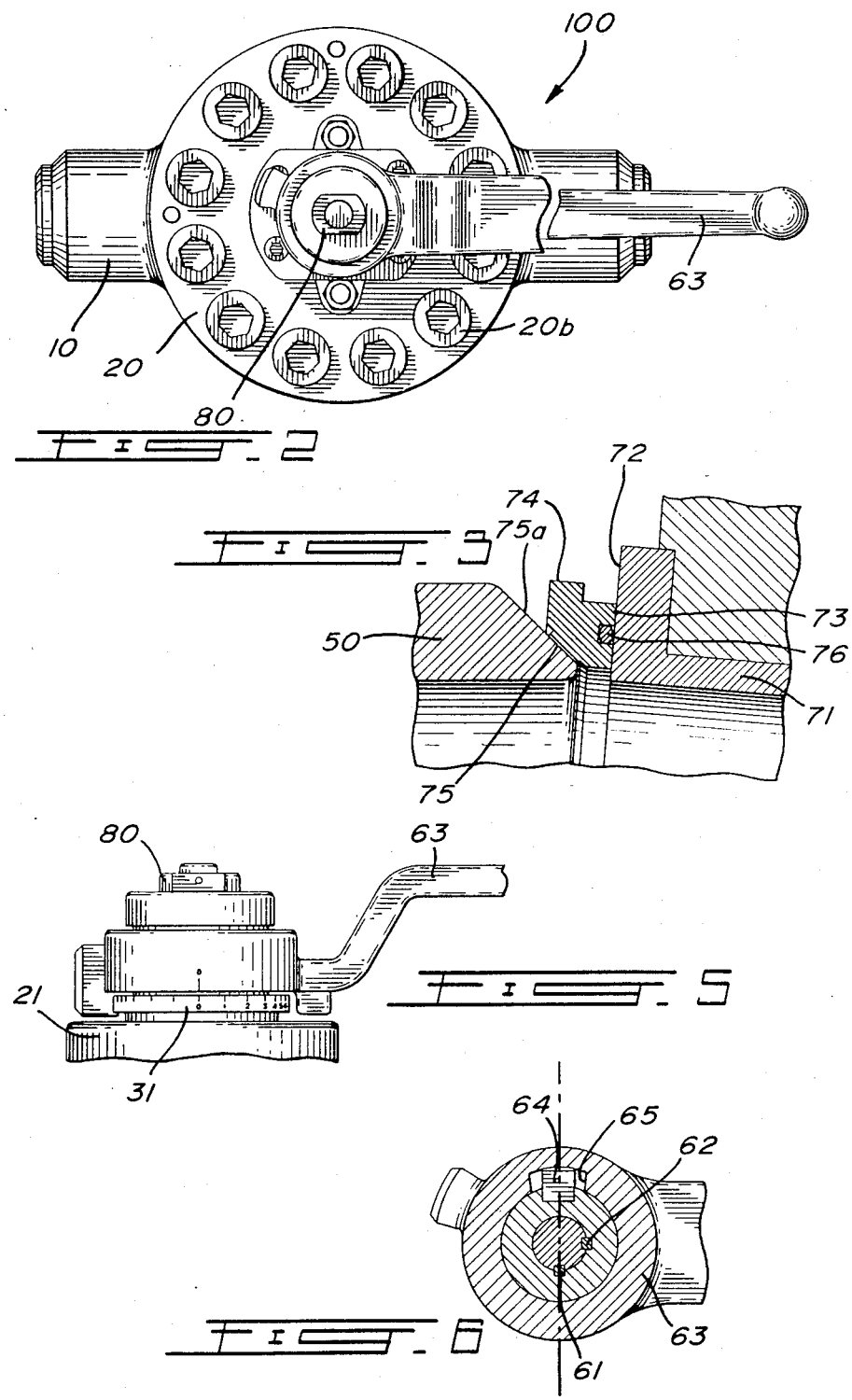

METAL SEATED BALL VALVES

BACKGROUND OF INVENTION (a) Field of the Invention

The present invention relates to improvements in top entry ball valves and particularly metal seated top entry ball valves.

Metal to metal seated ball valves are utilized in a number of applications, especially where the abrasive action of fluids and solids causes erosion of resilient seats. Even Y-pattern glove valves have a very limited life span in such instances. Apart from this, ball valves with resilient seats cannot be used in applications where temperatures exceed 400°–500° F.

Typical services for metal seated ball valves include; abrasive process and pipeline slurries, high pressure steam blowdown, heavy oil service, high temperature gasification systems, safety shut-off for combustion controls, isolating steam flow at pressures of 1,500 to 3,675 PSI and flow control of corrosive and erosive fluids at high pressure or temperature. Line pressures in these systems may go as high as 9,000 PSI and operating temperatures may range as low as minus 250° F. (minus 157 C.) to above 1,000 F. (538° C.). Metal seated trunnion mounted full bore ball valves are mostly suited for the these extreme services.

(b) Description of Prior Art

The deemed most advanced prior art designs in ball valves of the metal seated type are manufactured by the firm Neles in Finland and the firm EPG in the U.S.A. In the prior art designs, the ball and stem are one unit, the ball being trunnion mounted via a pair of trunnions mounted-guided in bearing sleeves. Such ensures reliable response and operation with little effect from hydraulic thrust of flow. The surface of the ball is usually hard faced with stellite or alternatively overlaid with chromium or carbide oxides.

In order to achieve high seat loading in valve closed position, the prior art seats, with stellite seating faces, are preloaded by springs, a single one in the case of Neles and multiply ones in the case of EPG. A major drawback regarding such designs stems from the fact the springs are in the flow area of the valve and are thus subject to fatique and breakage.

Again, in the prior art, to ensure high quality and positive sealing, the surfaces of the balls and seats are diamond lapped finished to 16-24 r.m.s. in sets. Notwithstanding the high quality surface finishes, the operating torques are three-four times higher than ball valves having resilient seats, due to the sealing force exerted by the two spring means mentioned above. Neles therefore limits the maximum pressure for metal seated valves to ANSI class 600. EPG valves however are available in sizes 2-8 inches in ANSI classes 150-1500 and ½ inch–8 inches in classes 2500 and 4500 lbs. All these valves are very expensive and it must be emphasized, use powerful actuators.

Regarding leakage rates, Neles specifies standard allowable factory leakage rate at maximum rated pressure—100 cm$^3$/per hour/per inch of diameter of nominal valve size. For example, a two inch valve—200 cm$^3$/hour. EPG specifies tightness rates comparable to globe and gate valves.

A further major drawback regarding the Neles metal seated ball valves is that they are not serviceable in line, due to having symmetrical split body construction. While EPG designs include the top entry feature, allowing in-line service and replacement of parts, they include an additional flange cover on the bottom of the valve body. A further prior art design, being one manufactured by Hills McCanna, comprises a top entry standard ball valve with tapered metal seats, but includes non-trunnion free-floating ball. In this valve, the metal seats are lapped-in with the tapered body surface and the ball. There is a constant load on the body seat-ball sealing surfaces from a heavy spring again located in the flow area, and the wedge effect of the tapered seats. The full sealing load is maintained during the 90° ball movement, resulting in enormous operating torques being required. There are no spring loaded seats to retract as in Neles or EPG types. The manufacturer overcomes this serious deficiency by installing on the bottom of the valve an adjusting stem-rod, using stem packing and a gasket seal. The position of ball and seats (with the cover removed) is adjusted to a zero position which allows the ball to turn. The sealing thrust is then accomplished by the spring. The valve is offered for ANSI classes 150, 300 and 600 lbs. The free-floating ball increases the breakaway torque of a closed valve and is not recommended for flow control applications.

SUMMARY OF INVENTION

It is therefore a main object of the present invention to provide a top entry ball valve and particularly a metal seated top entry ball valve, which overcomes the drawbacks and disadvantages mentioned above. Particularly, to provide a metal seated top entry ball valve wherein the ball is fully trunnion mounted and the valve is of full bore ball type, which does not suffer the disadvantages discussed above.

As a result of the present invention, applicant has eliminated (1) springs in the flow area of the valve, which are subject to fatique and breakage by high temperature service and (2) high breakaway and operating torques two-four times the torque of ball valves having resilient seats. The valves in accordance with the present invention include the following new features: (a) hard faced sealing surfaces, including body seat; (b) adjustable seating load; springs remote from the flow area; and (c) means for lifting the ball and seats prior to turning the ball to provide smooth and low torque operation.

In one aspect of the present invention, there is provided a top entry ball valve of wedge seat type comprising in combination a valve body including a bonnet portion, the bonnet portion comprising a flanged body secured to said valve body and a ring flange secured to the flanged body, a first nut means having an external thread thereon threaded into the ring flange, valve stem means positively secured to the valve ball, the valve stem means including a flange means thereon, the valve stem means being rotatably mounted in the first nut means and extending outwardly on opposite sides thereof, a second nut means having an external thread, the second nut means extending over the stem means and keyed thereto, the external thread of the second nut means being threaded upon a handle for use in rotating the stem means, spring means intermediate the flange means on the stem means and the first nut means for urging the flange means on the stem means away from the first nut means, third nut means threaded on the stem means and engaging the second nut means thereby securing the stem means to the first and second nut means whereby when the third nut means is tightened on the stem means, the spring means is compressed intermediate the flange means on the stem means and the first nut means, and whereby when the third nut means is tightened on the stem means, the handle is rotatable relative to the second nut means to thereby provide reciprocal movement of the stem means relative to the first nut means and accordingly reciprocal movement within the bonnet portion respectively to move the valve ball toward and away from the valve seats, abutment means on the second nut means and on the handle and engageable and disengageable one with another upon relative rotational movement therebetween upon the threads thereof, and wherein upon engagement of the abutments one to another the handle rotates the second nut means and accordingly the stem means and ball secured thereto relative to the bonnet portion, whereby the rotational movement of the handle upon the valve may firstly move the ball in a direction away from the valve seats to relieve the seating pressure exerted by the spring means and secondly, with continued rotation in the same direction, turn the ball to effect positive opening of the valve, and thirdly with continued rotation of the handle in the same direction, will effect a general closing of the valve, and fourthly with rotation of the handle in an opposite direction, permit movement of the ball toward the valve seats allowing the spring means to apply seating pressure to effect positive closing of the valve.

In a further aspect of the present invention, there is provided an arrangement for a ball type valve having a body, the arrangement providing relief from seating load when turning the ball relative to the valve body to effect either opening or closing of the valve by handle or the like means connected to the ball via stem means, comprising in combination, means including a thread thereon, the means being secured to the stem means for positive rotation therewith during the valve opening or closing, means engaging the stem means for inhibiting free rotation thereof relative to the valve body, handle means threadedly engaging the thread on the means secured for positive rotation, abutment means on the means secured for positive rotation, the abutment means being engageable with further abutment means on the handle means, the abutment means and further abutment means being arrangeable in spaced relation one to another such that limited and relative rotational movement between the means secured for rotation and the handle means is permitted via the threads whereby to impart reciprocal movement of the stem means relative to the handle means and whereby upon engagement of the abutment with the further abutment, the handle means imparts rotational movement to the stem means relative to the valve body.

In a still further aspect of the present invention, there is provided a metal seat for a ball valve comprising in combination, an annular member for positively securing in the flow passage of the valve in the vicinity of the valve ball, the annular member having a planar end face extending toward the valve ball, and a ring member having a planar face for sealingly engaging the planar face of the annular member, the ring member including a concave face for sealing engaging the ball, at least the ring member being adapted to engage means in the valve body to prevent rotation thereof relative to the valve body during rotation of the ball to effect opening or closing of the valve.

In a still further aspect of the present invention, there is provided an arrangement for top a entry ball valve having a body, the arrangement providing relief from seating load when turning the ball to effect either opening or closing of the valve by handle or the like means connected to the ball via stem means, comprising in combination, a nut means having an external thread thereon, the nut means being secured to the stem means by key means to ensure positive rotation of the nut means with the stem means during the valve opening or closing, spring means operatively engaging the stem means to inhibit free rotational movement thereof relative to the valve body, handle means threadedly engaging the external thread of said nut means, and abutment means on the nut means and projecting therefrom and adapted to engage a further abutment means on the handle means, the further abutment means comprising a slot in the handle means, the slot being of greater circumferential dimension to that of the nut abutment means whereby the nut abutment means and further abutment means are positionable one to another in spaced relation affording limited and relative rotational movement between the nut means and the handle means via the engaging threads whereby to impart reciprocal movement of the stem means relative to the handle means and whereupon engagment of the nut abutment means with the further handle abutment means, the handle means imparts rotational movement to the stem means and accordingly the ball relative to the valve body.

BRIEF DESCRIPTION OF THE DRAWINGS

The invention is illustrated by way of example in the accompanying drawings wherein:

FIG. 1 is a sectioned elevational view taken through a valve in accordance with the present invention;

FIG. 2 is a plan view of the valve shown in FIG. 1;

FIG. 3 is an enlarged view of a portion of the valve shown in FIG. 1 and being denoted therein by circle "A";

FIG. 4 is an enlarged view of a further portion of the valve shown in FIG. 1, taken along line 4—4 and incorporating an alternative part to that shown in FIG. 3;

FIG. 5 is a fragmentary full view of the top portion of the valve shown in FIG. 1; and FIG. 6 is a part sectioned plan view taken along line 6—6 in FIG. 1.

DESCRIPTION OF PREFERRED EMBODIMENTS

Referring now in detail to the drawings, there is seen in FIG. 1, a top entry ball valve of wedge seat type 100 having a valve body 10 and bonnet portion 20 as further seen, bonnet portion 20 comprises a flanged body 20a, secured by bolts 20b to valve body 10 and a ring flange 21 secured by bolts 21a to flanged body 20a. A nut means 30 having an external thread 30a is threaded into ring flange 21. A valve stem 40 is positively secured to ball 50 via pin 50a passing through apertures 50b and 50c respectively in the squared end of stem 40 and trunnion 51, extending of ball 50. It will be noted, ball 50 is also supported by second trunnion 52 mounted in valve body 10 via a bearing 53.

Stem 40, which is rotatably supported in nut means 30 and which extends outwardly on opposite sides thereof, includes a flange 41 for cooperative engagment with spring means 42, further discussed hereinafter. Nut means 30 also includes a flanged portion 31, shown in both FIGS. 1 and 5 and discussed further hereinafter.

Again referring to FIG. 1, there is seen a further nut means 60 having an external thread 60a, nut means 60 extending over stem 40 and keyed thereto by keys 61 and 62. Thread 60a engages threads 60b in handle 63 for use in rotating stem 40 and for applying reciprocal movement to stem 40 as also discussed hereinafter. Spring means 42, comprises in the case of the present embodiment, a spring pack made up of belleville washers mounted upon stem 40. It will be understood, that alternative suitable spring means may also be used in place of the belleville washers.

As will be evident from the description hereinafter, spring means 42 acts upon flange 41 in cooperation with nut means 30, to move stem 40 and accordingly connected ball 50 toward seats 70. A further nut means 80 is threaded upon the free end of stem 40, to engage nut means 60 and securely clamps stem 40 to nut means 30 and 60, compressing spring means 42 in the process. Nut means 80 is tightened to such a degree handle 63 may still move at least a limited amount, such as through an arc of approximately 15° for example, either side of the axis datum shown in FIG. 6, to effect slight reciprocal movement of stem 40 relative to nut means 60, for example, thus respectively moving ball 50 toward and away from seats 70. Nut means 80 applies compression to handle 63, but thrust bearings 66 ensure smooth rotary movement takes place between nut means 60 and nut means 80, for example. As will be realized and discussed further hereinafter, rotary movement of nut means 30 upon its threads moves ball 50, depending upon direction of movement, either toward or away from seats 70 thereby providing adjustment to control leakage therepast.

As best seen from FIG. 6, an abutment 64 projects outwardly from nut means 60 and engages either one or the other faces of an abutment 65 depending upon direction of rotation of handle 63 upon threads 60a/60b. The spacing of abutments 64 and 65 in the case of the present embodiment shown, permits rotary movement of handle 63 upon nut means 60 through an arc of approximately 10° either side of the central axis datum, before the abutments 64 and 65 engage one another to effect movement of stem 40 by handle 63, in a selected direction. This "free" arc handle movement is sufficient, in the case of the present preferred embodiment disclosed, to effect lift of ball 50 from seats 70, thus to relieve seating load, prior to turning ball 50 by handle 63 to effect opening or closing of the valve.

The aforementioned arc movement may of course be altered by selecting a different pitch for threads 60a/60b. As further noted, nut means 80 is cotter pinned to prevent slackening of the same upon stem 40. Likewise, keys 61 and 62 prevent rotation of nut means 60 upon stem 40. Stop means to control movement of handle 63 may be provided on handle 63 for engagment with stops on ring flange 21.

Referring to the lower area of stem 40, it will be seen it is supported at its connection to ball 50 by a trunnion bearing 53a. Thus not only does bearing 53a support trunnion 51, but also stem 40 and the coupling connecting stem 40 with ball 50. This provides a particularly rugged and strong arrangement in cooperation with bearing 53 in valve body 10, for supporting ball 50 and enabling it to withstand high pressure/temperature conditions.

Directly above bearing 53a in flanged body 20 are seen seal packings 90 for sealing stem 40 with flanged body 20, seal packing 90 being secured by a gland member 91 threaded into flange body 20. Apart from sealing fluid, the valve seal packings 90 serve to isolate spring means 42 and the rest of the valve opening mechanism from the fluid flow through the valve. It will be evident from the foregoing, there is provided by the present invention, a relatively simple and compact design of valve control mechanism, which may be assembled and disassembled from the valve body 10 in a very simple manner and which lends itself to mounting on various valves which may call for rotary and reciprocal movement of the valve stem. Furthermore, it provides a complete bonnet arrangement which may be conveniently and easily removed from the valve body facilitating ready servicing.

Referring to seats 70, details of which are clearly shown in FIGS. 3 and 4, (the latter also serving to show alternative ring 71a) they are seen in one instance i.e. FIG. 3, to each comprise a bushing 71 positively secured as by suitable means, and which may include welding or braising, to valve body 10. Bushing 71 is seen to include a planar end face 72 which sealingly engages planar end face 73 of a ring member 74. Ring member 74 includes a concave face 75 sealingly engaging the working face 75a of ball 50. As in the case of the FIG. 4 design, ring member 74 is guided by a pair of abutments 74a (only one of which is seen in FIG. 4) which allow up and down guided movement of ring member 74 with ball 50, relative to valve body 10. Abutments 74a also prevent rotary movement of ring member 74 with ball 50 during the turning of stem 40 to effect opening or closing of the valve.

In a further refinement of design, an "O" ring seal of silver inconel 76 is arranged, either as shown, or alternatively recessed in bushing 71 or ring 71a. In the case of the alternative FIG. 4 design, where bushing 71 is replaced by annular ring 71a recessed into valve body 10, such may be secured by welding or brazing. Abutments 74a may as shown, serve to reinforce prevention of rotation of bushing 71 and ring 71a respective valve body 10. Bushing 71 and accordingly annular ring 71a may comprise solid stellite material, as may ring member 74. Alternatively, bushing 71 and accordingly annular ring 71a, may comprise, in the case of large valves for example above 3 inch size, austenitic stainless steel hard faced with stellite. Providing all seating surfaces, including body seat, with hard faced stellite, or sizes ½ inch–3 inch with solid stellite, is deemed a novel feature of the present invention.

Referring briefly to the operation of valve 100. FIG. 1 shows valve 100 in fully open position. Although not visible from the drawing, ball 50 is in raised position relative the valve seats 70, accordingly relieving seating pressure thereon. The raising of ball 50 is facilitated by reciprocal movement of stem 40, effected by initial free, non-driving, rotary movement of handle 63 upon stem 40, as explained hereinafter. To close valve 100 from the illustrated open position, handle 63 is rotated through an arc of 90°, accordingly moving stem 40 therewith, such being effected by engagement of abutment 64 with abutment 65, which occurs prior to rotating handle 63 to move ball 50 from a closed to the open position shown. Upon completion of the 90° turn by handle 63, the latter is moved in an opposite rotary direction through a relatively small arc. During this latter movement, ball 50 is moved by axial movement of stem 40 to a fully seated non-leak position upon seats 70, with the aid of spring means 42, the axial movement occuring during the turning of handle 63 upon nut means 62 to move abutments 64 and 65 away from one another. The moved apart position of abutments 64 and 65 are clearly seen in FIG. 6. Suitable stops or markings may be provided to indicate a fully valve open and fully valve closed position for handle 63.

From the foregoing it will be seen, the arrangement in FIG. 6 provides a loss motion mechanism. Handle 63 only rotates stem 40 when abutments 64 and 65 are in engagement one with another. During free rotary movement, i.e. when handle 63 is rotated without abutments 64 and 65 being engaged, stem 40 is moved in an axial direction and depending on the direction of rotation of handle 63, it is either moving stem 40 and accordingly ball 50, toward or away from seats 70.

As more clearly seen from FIG. 1, when handle 63 is rotated upon nut means 60 when abutments 64 and 65 are not engaged one to another, nut means 60 is, depending upon the direction of rotation of handle 63, either moved axially in a direction toward or away from, for example, bonnet portion 20. Since stem 40 with ball 50 is positively secured to nut means 60, via nut means 80, ball 50 is at the same time moved axially, accordingly to fully seat the same (aided by spring means 42) or relieve seating of the same, respective seats 70.

To ensure proper operative axially movement of stem 40 is obtained, the position of nut means 80 upon stem 40 is adjusted. To accomplish this adjustment, nut means 80 is backed-off from a fully home position, just sufficiently to permit nut means 60 and handle 63 to be accommodated between nut means 30 and itself, that is when nut means 60 has been fully axially advanced out of handle 63, i.e. in a direction away from bonnet portion 20, during the loss-motion movement of handle 63.

To compensate for wear on the parts resulting in leakage past the seal seats 70, nut means 30 is rotated upon its threads, accordingly axially moving the same together with stem 40 and ball 50 to bring the latter into a tighter sealing position respective seats 70. As seen from FIG. 5, nut means 30 includes a flange and graduated scale 31 thereon for use in conjunction with a zero marking on handle means 63. Although not shown in the drawings, and perhaps relative to some services, valve body 10 may include a removable plug for use in monitoring leakage past seats 70. With such plug removed, proper adjusted position of nut means 30 may be confirmed.

I claim:

1. A top entry ball valve of wedge seat type comprising in combination a valve body including a bonnet portion, said bonnet portion comprising a flanged body secured to said valve body and a ring flange secured to said flanged body, a first nut means having an external thread thereon threaded into said ring flange, valve stem means positively secured to the valve ball, said valve stem means including a flange means thereon, said valve stem means being rotatably mounted in said first nut means and extending outwardly on opposite sides thereof, a second nut means having an external thread, said second nut means extending over said stem means and keyed thereto, said external thread of said second nut means being threaded upon a handle for use in rotating said stem means, spring means intermediate said flange means on said stem means and said first nut means for urging said flange means on said stem means away from said first nut means, third nut means threaded on said stem means and engaging said second nut means thereby securing said stem means to said first and second nut means whereby when said third nut means is tightened on said stem means, said spring means is compressed intermediate said flange means on said stem means and said first nut means, and whereby when said third nut means is tightened on said stem means, said handle is rotatable relative to said second nut means to thereby provide reciprocal movement of said stem means relative to said first nut means and accordingly reciprocal movement within said bonnet portion respectively to move the valve ball toward and away from the valve seats, abutment means on said second nut means and on said handle an engageable and disengageable one with another upon relative rotational movement therebetween upon said threads thereof, and wherein upon engagement of said abutments one to another said handle rotates said second nut means and accordingly said stem means and ball secured thereto relative to said bonnet portion, whereby said rotational movement of said handle upon said valve may firstly move the ball in a direction away from the valve seats to relieve the seating pressure exerted by said spring means and secondly, with continued rotation in the same direction, turn the ball to effect positive opening of the valve, and thirdly with continued rotation of the handle in the same direction, will effect a general closing of the valve, and fourthly with rotation of said handle in an opposite direction, permit movement of said ball toward said valve seats allowing said spring means to apply seating pressure to effect positive closing of the valve.

2. A top entry ball valve as defined in claim 1, wherein thrust bearing means is mounted intermediate said spring means and said first nut means also intermediate said first and second nut means and also intermediate said handle and said third nut means.

3. A top entry ball valve as defined in claim 1, wherein such is of the metal seated type.

4. A top entry ball valve as defined in claim 1, wherein said first nut means includes a peripheral flange extending to overlie said ring flange adjacent said handle.

5. A top entry ball valve as defined in claim 4, wherein said peripheral flange includes thereon a marked scale for use with a line marking on said handle, said scale and line marking being for use in providing an indication for valve wear adjustment.

6. A top entry ball valve as defined in claim 1, wherein the ball thereof is mounted via a pair of trunnions one of which extends in axial alignment with that of said stem means and receives said stem means therein, while the other of said trunnions extends on like axis to be received into said valve body.

7. A top entry ball valve as defined in claim 1, wherein said spring means comprises belleville washers encircling said stem means.

8. A top entry ball valve as defined in claim 1, including seal means intermediate said stem means and said bonnet portion, said seal means being secured in place by gland and nut means extending in spaced adjacent relation to said flange means on said stem means.

9. A top entry ball valve as defined in claim 1, wherein said bonnet portion includes a central cavity accommodating said spring means and said flange on said stem means.

10. A top entry ball valve as defined in claim 3, wherein said metal seats each comprise an annular member positively secured in said valve body, said annular member having a planar end face extending toward the valve ball, a ring member having a planar face and sealingly engaging that of said annular member, said ring member including a concave face sealingly engaging said ball and guide means in said valve body engaging at least said ring member to restrict movement thereof relative to said valve body when rotating said ball to effect opening or closing of the valve.

11. A top entry ball valve as defined in claim 10, including a silver inconel "O" ring seal supported in a selected one of said planar faces and engaging the other of said planar faces to provide improved sealing between said planar faces.

12. A top entry ball valve as defined in claim 10, wherein said planar end face comprises a flange on said annular member.

13. A top entry ball valve as defined in claim 10, wherein said annular member comprises solid stellite.

14. A top entry ball valve as defined in claim 10, wherein said annular member comprises austenitic stainless steel hard faced with stellite.

15. A top entry ball valve as defined in claim 10, wherein said annular member comprises austenitic stainless steel overlaid with chromium oxide.

16. A top entry ball valve as defined in claim 10, wherein said annular member comprises austenitic stainless steel overlaid with chromium carbide.

17. An arrangement for a top entry ball valve having a body, said arrangement providing relief from seating load when turning the ball to effect either opening or closing of the valve by handle or the like means connected to the ball via stem means, comprising in combination:

(a) a nut means having an external thread thereon, said nut means being secured to said stem means by key means to ensure positive rotation of said nut means with said stem means during said valve opening or closing;

(b) spring means operatively engaging said stem means to inhibit free rotational movement thereof relative to said valve body;

(c) handle means threadedly engaging said external thread of said nut means; and (d) abutment means on said nut means and projecting therefrom and adapted to engage a further abutment means on said handle means, said further abutment means comprising a slot in said handle means, said slot being of greater circumferential dimension to that of said nut abutment means whereby said nut abutment means and further abutment means are positionable one to another in spaced relation affording limited and relative rotational movement between said nut means and said handle means via said engaging threads whereby to impart reciprocal movement of said stem means relative to said handle means and whereupon engagement of said nut abutment means with said further handle abutment means, said handle imparts rotational movement to said stem means and accordingly the ball relative to the valve body.

18. An arrangement as defined in claim 17, wherein said spring means comprises belleville type spring washers encircling said stem means and engaging a flange means comprising said stem means.

19. An arrangement as defined in claim 18, wherein said spring washers engage a further nut means encircling said stem means and are in abuting relation to said nut means threadily connected to said handle means.

20. An arrangement as defined in claim 19, wherein said stem means includes a threaded free end portion having threaded thereon a nut clampingly securing in cooperation with said flange means, said spring washers, said nut means threaded on said handle means and said further nut means together.

21. An arrangement as defined in claim 20, including thrust washer means intermediate said nut threaded on said free end portion and said nut means threaded on said handle means, also intermediate said nut means threaded on said handle means and said further nut means encircling said stem means and also intermediate said further nut means encircling said stem means and said belleville type spring washers.

22. An arrangement as defined in claim 21, including a ring flange for detachably securing to a valve bonnet portion comprising said valve, said ring flange being threadedly secured to said further nut means.

* * * * *